United States Patent [19]
Eder et al.

[11] 3,761,507
[45] Sept. 25, 1973

[54] PROCESS FOR THE PREPARATION OF HEXAHYDROINDAN-4-CARBOXYLIC ACID ESTER DERIVATIVES

[75] Inventors: Ulrich Eder, Berlin; Hans Peter Lorenz, Unna, both of Germany

[73] Assignee: Schering Aktiengesellschaft, Berlin and Bergkamen, Germany

[22] Filed: June 15, 1972

[21] Appl. No.: 263,226

[30] Foreign Application Priority Data
June 18, 1971  Germany.................. P 21 31 230.1

[52] U.S. Cl............................ 260/468 G, 260/514 G
[51] Int. Cl............................................. C07c 69/74
[58] Field of Search...................... 260/468 G, 514 G

[56] References Cited
OTHER PUBLICATIONS
H. O. House, Modern Synthetic Reactions, pp. 1–22, W. A. Benjamin, Inc., New York.

*Primary Examiner*—Lorraine A. Weinberger
*Assistant Examiner*—Paul J. Killos
*Attorney*—I. William Millen et al.

[57] ABSTRACT
In a process for the preparation of hexahydroindan-4-carboxylic acid derivatives of the formula

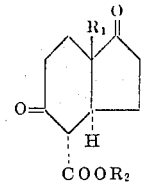

wherein $R_1$ is alkyl group of one to six carbon atoms and $R_2$ is hydrogen or a hydrocarbon residue of one to eight carbon atoms, by hydrogenating a tetrahydroindan-4-carboxylic acid derivative of the formula

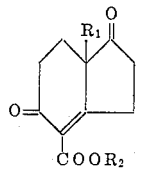

wherein $R_1$ and $R_2$ have the above-indicated meanings with hydrogen in the presence of a palladium- or rhodium-containing hydrogenation catalyst, the improvement which comprises conducting the hydrogenation reaction in the presence of a stereospecific amount of a tertiary amine.

7 Claims, No Drawings

PROCESS FOR THE PREPARATION OF HEXAHYDROINDAN-4-CARBOXYLIC ACID ESTER DERIVATIVES

BACKGROUND OF THE INVENTION

1. Field of the Invention

This invention relates to a process for preparing hexahydroindan-4-carboxylic acid derivatives. More particularly, this invention relates to a process for preparing hexahydroindan-4-carboxylic acid derivatives by hydrogenating a corresponding tetrahydroindan-4-carboxylic acid derivative using a palladium or rhodium-containing hydrogenation catalyst.

2. Description of the Prior Art

Hexahydroindan-4-carboxylic acid derivatives of Formula I

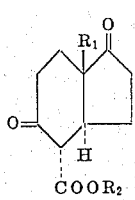

wherein $R_1$ is alkyl having one to six carbon atoms and $R_2$ is hydrogen or a hydrocarbon residue of one to eight carbon atoms, have heretofore been prepared by hydrogenating a tetrahydroindan-4-carboxylic acid derivative of Formula II

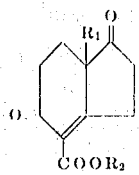

wherein $R_1$ and $R_2$ have the above-indicated values with hydrogen in the presence of a palladium- or rhodium-containing hydrogenation catalyst.

The carboxylic acids of Formula I are known valuable intermediates in the total synthesis of pharmacologically valuable steroids, e.g., estrone, estradiol, 18-methyl-estradiol, equilin, equilenin, testosterone, 18-methyl-testosterone, 17α-ethinyl-19-nortestosterone, or 17α-ethinyl-18-methyl-19-testosterone.

Preferably $R_1$ in Formulae I and II is an alkyl residue having one to four carbon atoms, e.g., methyl, ethyl, propyl, or butyl.

$R_2$ is preferably a hydrocarbon residue of one to eight carbon atoms. These hydrocarbon residues can be straight-chain or branched alkyl of one to eight carbon atoms, five- or six-membered cycloalkyl of five to eight carbon atoms, or aryl residues of six to eight carbon atoms. Suitable hydrocarbon residues include but are not limited to methyl, ethyl, n-propyl, cyclopentyl, n-hexyl, cyclohexyl, phenyl, n-heptyl, p-tolyl, or n-octyl residue.

The carboxylic acids of Formula I and the esters thereof can be produced by the hydrogenation of compounds of Formula II with hydrogen in the presence of known hydrogenation catalysts (Russian Original Disclosure No. 216,685; Bull. Soc. Chim. France 1968, 3664). However, these prior art hydrogenation methods do not proceed in a stereospecific manner, and accordingly are poorly suited for the commercial production of compounds of Formula I.

Example 2 of the Russian Original Disclosure No. 216,685, describes the hydrogenation of a compound of Formula II wherein $R_1$ is methyl and $R_2$ is ethyl (compound IIa of the scheme of formulae below). When conducting the experiment described therein, a reaction product is obtained having the physical constants set forth in the Russian Original Disclosure. However, this product is not a single compound, but rather is a mixture of at least two substances, compound Ia and compound III of the following formula scheme:

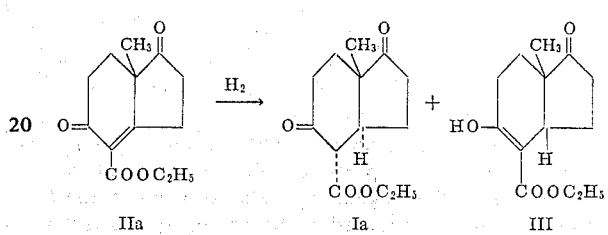

The presence of a mixture of compounds in this reaction product has been established by a thorough examination thereof. When the reaction product is chromatographed on a thin-layer silica gel plate using cyclohexane/ethyl acetate 1 : 1 as the eluent, the hydrogenation product is separated into two components. By examining the reaction product by UV spectroscopy, a strong absorption band of the enolized keto group in the 5-position is obtained at 270 mμ. The compound of Formula Ia does not exhibit such an absorption band, since it does not enolize, whereas compound III possesses this band, since it is present almost exclusively in the enolized form. An examination by NMR spectroscopy unequivocally confirms that the thus-obtained reaction product is a mixture of the two substances Ia and III.

The separation of the above reaction product into its constituent compounds by chromatography or fractional crystallization is extremely complicated and expensive, and normally results in an extremely poor yield; consequently, the above processes is poorly suited for preparing the compounds of Formula I on a technical or commercial scale.

OBJECTS OF THE INVENTION

Accordingly, it is an object of this invention to provide a process for the preparation hexahydroindan-4-carboxylic acid derivatives.

Another object of this invention is to provide a process for hydrogenating tetrahydroindan-4-carboxylic acid derivatives which gives almost quantitative yields of a unitary reaction product.

Upon further study of the specification and appended claims, further objects and advantages of this invention will become apparent to those skilled in the art.

SUMMARY OF THE INVENTION

The above and other objects are attained in accordance with this invention by providing a process for the preparation of hexahydroindan-4-carboxylic acid derivatives of Formula I

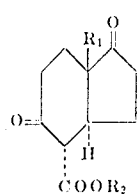

wherein $R_1$ is alkyl having one to six carbon atoms and $R_2$ is hydrogen or a hydrocarbon residue of one to eight carbon atoms, by hydrogenating a tetrahydroindan-4-carboxylic acid derivative of Formula II

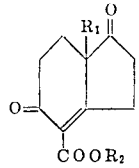

wherein $R_1$ and $R_2$ have the above-indicated values with hydrogen in the presence of a palladium- or rhodium-containing hydrogenation catalyst, wherein the hydrogenation is conducted in the presence of a tertiary amine.

DETAILED DISCUSSION

Surprisingly, it has now been found possible to produce the hexahydroindan-4-carboxylic acid derivatives of Formula I in almost quantitative yields by hydrogenation of the tetrahydroindan-4-carboxylic acid derivatives of Formula II with hydrogen in the presence of palladium- or rhodium-containing catalysts, if the hydrogenation is conducted in the presence of a tertiary amine.

The palladium or rhodium containing catalysts useful in the hydrogenation process of this invention include but are not limited to palladium-charcoal-catalyst (5 or 10%), palladium-barium-sulfate catalyst (10%), palladium-calcium carbonate catalyst (5 or 10%) palladium-black-catalyst, rhodium-carbon-catalyst (5 or 10%) or rhodium-alumina-catalyst (5 or 10%).

Tertiary amines suitable for conducting the process of this invention include but are not limited to tertiary amines of the formula $NR_3R_4R_5$ wherein $R_3$, $R_4$, and $R_5$ are each a hydrocarbon residue having one to eight carbon atoms. The hydrocarbon residue can be straight-chain or branched alkyl of one to eight carbon atoms, five- or six-membered cycloalkyl of five to eight carbon atoms, or aryl residues of six to eight carbon atoms. Suitable hydrocarbon residues include but are not limited to methyl, ethyl, n-propyl, cyclopentyl, n-hexyl, cyclohexyl, phenyl, n-heptyl, p-tolyl, or n-octyl residues; furthermore, the substituents $R_4$ and $R_5$ can form a closed ring of five or six members, optionally containing an oxygen atom, a nitrogen atom, or an alkylamino group.

Closed ring tertiary amines are preferably those in which the tertiary amine nitrogen is included in the ring structure, e.g., N-hydrocarbon residue substituted derivatives of pyrrole, imidazole, pyrazole, piperidine, pyrazine, pyrimidine, pyridazine.

Preferred closed ring tertiary amines are the N-alkyl derivatives of pyrrole, pyrrolidine, imidazole, piperidine, and morpholine, especially when the alkyl group is methyl.

Particularly suitable are those amines of the formula $NR_3R_4R_5$ wherein at least one substituent, preferably, $R_3$, represents a lower alkyl group having one to four carbon atoms, especially if at least two substituents are lower alkyl. Tertiary amines suitable for conducting the process of this invention include but are not limited to trimethylamine, triethylamine, methyl diisopropylamine, tri-n-butylamine, dimethylcyclopentylamine, dimethylcyclohexylamine, dimethylaniline, dimethylbenzylamine, methyl diisooctylamine, N-methylpyrrole, N-methylpyrrolidine, N-methylimidazole, N-methylpiperidine, or N-methylmorpholine. Preferred tertiary amines for use in the present invention are triethylamine, tripropylamine, N-methylpiperidine, dimethyl aniline and N-methylmorphalin.

The process of this invention is conducted with a stereospecific amount of tertiary amine, i.e., in the presence of an amount of tertiary amine effective to form the compound of Formula Ia as a principal or sole product of the hydrogenation reaction. To ensure maximum stereospecificity, relatively large molar excess, calculated on the starting tetrahydroindan-4-carboxylic acid derivative, is usually employed, e.g., 3 – 50 molar excess. However, lesser amounts, e.g. as little as 0.2 molar equivalent, exerts a stereoregulating effect. Thus, the process of this invention can be conducted utilizing the tertiary amine as the sole solvent. However, preferably the hydrogenation reaction is conducted in the solvents customary for hydrogenation reactions with the addition of a stereospecific amount of 1–20% by vol. of tertiary amine. Suitable solvents for hydrogenation reaction are well known and include but are not limited to hydrocarbons, e.g., hexane, heptane, cyclohexane, benzene, toluene, or xylene; ethers, e.g., diethyl ether, diisopropyl ether, di-n-butyl ether, tetrahydrofuran, dioxane, or glycol dimethyl ether; esters, e.g., ethyl acetate; or alcohols, e.g., methanol, ethanol, isopropanol, or n-butanol.

The hydrogenation can be conducted at room temperature, as well as at lower or higher temperatures. Preferably, the reaction is carried out at a temperature in the range of from −10° to +50° C.

The hydrogenation can be effected under normal or elevated pressure, preferably under a hydrogen partial pressure of 1–50 atmospheres.

The starting substances for the process of this invention can be synthesized, for example, as follows:

One mol of 3-keto-4-pentenic acid ester is suspended in about 400 ml. of dioxane and 400 ml. of water, mixed with 1.15 mol of 2-alkylcyclopentane-1,3-dione, and refluxed for 6 hours in an argon atmosphere. The dioxane is then removed by vacuum distillation, and the aqueous phase is diluted with saturated sodium chloride solution and extracted with methylene chloride. The methylene chloride phase is dried over sodium sulfate, concentrated under vacuum, and the thus-obtained crude product is purified by crystallization.

The following examples serve to explain the process of this invention.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

EXAMPLE 1

6.1 g. of the ethyl ester of 7aβ-methyl-1,5-dioxo-5,6,7,7a-tetrahydroindan-4-carboxylic acid (m.p. 94° - 95.5° C. from ethanol) is dissolved in 100 ml. of benzene and 10 ml. of triethylamine, mixed with 0.5 g. of palladium animal charcoal (10%), and hydrogenated under normal pressure at room temperature. The hydrogen absorption is terminated after one hour. Then, the catalyst is filtered off, the solution is concentrated under vacuum, and the residue is recrystallized from diisopropyl ether, thus obtaining 5.7 g. of the ethyl ester of trans-7aβ-methyl-1,5-dioxo-3aα,4β,5,6,7,7a-hexahydroindan-4α-carboxylic acid, m.p. 54.5° - 56° C.

EXAMPLE 2

3.4 g. of the methyl ester of 7aβ-methyl-1,5-dioxo-5,6,7,7a-tetrahydroindan-4-carboxylic acid (m.p. 81°-83° C. from ethanol) is dissolved in 50 ml. of toluene and 1 ml. of triethylamine, mixed with 0.2 g. of palladium animal charcoal (5%), and hydrogenated under normal pressure at room temperature for 2 ½ hours. Then, the catalyst is filtered off, the solution is concentrated under vacuum, and the residue is recrystallized from diisopropyl ether, thus producing 3.06 g. of the methyl ester of trans-7aβ-methyl-1,5-dioxo-3aα,4β,5,6,7,7a-hexahydroindan-4β-carboxylic acid, m.p. 93°-95° C.

EXAMPLE 3

2.5 g. of the ethyl ester of 7aβ-ethyl-1,5-dioxo-5,6,7,7a-tetrahydroindan-4-carboxylic acid (m.p. 69°-71° C. from ethanol) is dissolved in 25 ml. of benzene and 5 ml. of triethylamine, mixed with 0.3 g. of palladium calcium carbonate, and hydrogenated under normal pressure at room temperature for 1 ½ hours. Then, the catalyst is filtered off, the solution is concentrated under vacuum, the residue is purified by chromatography over a silica gel column, and 2.20 g. of the ethyl ester of 7aβ-ethyl-1,5-dioxo-3aα, 4β, 5,6,7,7a-hexahydroindan-4α-carboxylic acid is obtained in the form of a colorless oil. IR bands at 5.74 μ and 5.87 μ.

The preceding examples can be repeated with similar success by substituting the generically and specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a process for the preparation of hexahydroindan-4-carboxylic acid derivatives of the formula

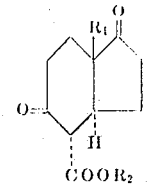

wherein $R_1$ is alkyl group of one to six carbon atoms and $R_2$ is hydrogen or a hydrocarbon residue of one to eight carbon atoms, by hydrogenating a tetrahydroindan-4-carboxylic acid derivative of the formula

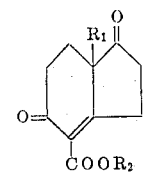

wherein $R_1$ and $R_2$ have the above-indicated meanings with hydrogen in the presence of a palladium- or rhodium-containing hydrogenation catalyst, the improvement which comprises conducting the hydrogenation reaction in the presence of a tertiary amine.

2. A process according to claim 1, wherein the tertiary amine has the formula $NR_3R_4R_5$, wherein $R_3$, $R_4$, and $R_5$ are each a hydrocarbon residue of one to eight carbon atoms.

3. A process according to claim 2, wherein at least one of $R_3$, $R_4$, and $R_5$ is alkyl of one to four carbon atoms.

4. A process of claim 2, wherein at least two of $R_3$, $R_4$ and $R_5$ are alkyl of one to four carbon atoms.

5. A process of claim 1, wherein said hydrogenation is conducted in a hydrogenation solvent admixed with 1–20% by volume of tertiary amine.

6. A process of claim 1, wherein hydrogenation is conducted under a hydrogen partial pressure of 1–50 atmospheres.

7. A process of claim 1, wherein the hydrogenation catalyst is palladium.

* * * * *